US012597226B2

(12) United States Patent
Bauer et al.

(10) Patent No.: US 12,597,226 B2
(45) Date of Patent: Apr. 7, 2026

(54) METHOD AND SYSTEM FOR AUTOMATED PLANT IMAGE LABELING

(71) Applicant: KWS SAAT SE & Co. KGaA, Einbeck (DE)

(72) Inventors: Christoph Bauer, Einbeck (DE); Christoph Fritzsch, Hardegsen (DE); Ludmilla Dahl, Einbeck (DE); Christian Jebsen, Einbeck (DE)

(73) Assignee: KWS SAAT SE & Co. KGaA, Einbeck (DE)

( * ) Notice: Subject to any disclaimer, the term of this patent is extended or adjusted under 35 U.S.C. 154(b) by 479 days.

(21) Appl. No.: 17/783,931

(22) PCT Filed: Dec. 14, 2020

(86) PCT No.: PCT/EP2020/085953
§ 371 (c)(1),
(2) Date: Jun. 9, 2022

(87) PCT Pub. No.: WO2021/122446
PCT Pub. Date: Jun. 24, 2021

(65) Prior Publication Data
US 2023/0049590 A1 Feb. 16, 2023

(30) Foreign Application Priority Data
Dec. 20, 2019 (EP) .................................... 19218722

(51) Int. Cl.
*G06V 10/56* (2022.01)
*G06V 10/58* (2022.01)
(Continued)

(52) U.S. Cl.
CPC ............ *G06V 10/56* (2022.01); *G06V 10/764* (2022.01); *G06V 10/774* (2022.01); *G06V 10/82* (2022.01); *G06V 10/58* (2022.01)

(58) Field of Classification Search
CPC .... G06V 10/56; G06V 10/764; G06V 10/774; G06V 10/82; G06V 10/58
(Continued)

(56) References Cited

U.S. PATENT DOCUMENTS

2018/0018537 A1* 1/2018 Kim ...................... G06V 20/698
2018/0157911 A1* 6/2018 Lo .............................. G06T 7/73
(Continued)

FOREIGN PATENT DOCUMENTS

WO 2017/105177 A1 6/2017

OTHER PUBLICATIONS

WeedNet: Dense Semantic Weed Classification Using Multispectral Images and MAV for Smart Farming, by Inkyu Sa, Zetao Chen, Marija Popovic, Raghav Khanna, Frank Liebisch, Juan Nieto, Roland Siegwart, IEEE Robotics and Automation Letters (vol. 3, Issue: 1, 2018, pp. 588-595) Pub Nov. 18, 2017 (Year: 2017).*
(Continued)

*Primary Examiner* — Ping Y Hsieh
*Assistant Examiner* — Heath E. Wells
(74) *Attorney, Agent, or Firm* — Troutman Pepper Locke LLP

(57) ABSTRACT

A computer-implemented method can include acquiring first training images using a first image acquisition technique, where each first training image depicts a plant-related motive; and acquiring second training images using a second image acquisition technique, where each second training image depicts the motive depicted in a respective one of the first training images. The method can include automatically assigning at least one label to each of the acquired second training images. The method can include spatially aligning the first and second training images which are depicting the same one of the motives into an aligned training image pair. The method can include training a machine-learning model
(Continued)

as a function of the aligned training image pairs and the labels, wherein during the training the machine-learning model learns to automatically assign one or more labels to any test image acquired with the first image acquisition technique which depicts a plant-related motive.

21 Claims, 5 Drawing Sheets

(51) Int. Cl.

| | | |
|---|---|---|
| *G06V 10/764* | (2022.01) | |
| *G06V 10/774* | (2022.01) | |
| *G06V 10/82* | (2022.01) | |

(58) Field of Classification Search
USPC ........................................................ 382/159
See application file for complete search history.

(56) References Cited

U.S. PATENT DOCUMENTS

| | | | |
|---|---|---|---|
| 2019/0277749 A1* | 9/2019 | Rushing | G06T 7/0004 |
| 2019/0384047 A1 | 12/2019 | Johnson et al. | |

| | | | |
|---|---|---|---|
| 2020/0184153 A1* | 6/2020 | Bongartz | A01G 9/249 |
| 2020/0401851 A1* | 12/2020 | Mau | G06F 18/254 |
| 2022/0276625 A1* | 9/2022 | Metzger | G05B 15/02 |
| 2023/0017425 A1* | 1/2023 | Bereciartua-Perez | G06T 3/4046 |
| 2023/0078852 A1* | 3/2023 | Campbell | G06F 16/29 705/7.11 |
| 2023/0177697 A1* | 6/2023 | Padwick | A01M 7/0089 382/103 |
| 2023/0306795 A1* | 9/2023 | Lechner | G07C 5/008 |

OTHER PUBLICATIONS

Nguyen et al. In "Training-Based Spectral Reconstruction from a Single RGB Image", ECCV, 2014, Part VII, LNCS 8695, pp. 186-201.

International Search Report and Written Opinion issued in PCT/EP2020/085953 dated Jan. 13, 2021.

Tombari et al., "Automatic detection of pole-like structures in 3D urban environments", 2014 IEEE/RSJ International Conference on Intelligent Robots and Systems, IEEE, 2014, pp. 4922-4929.

* cited by examiner

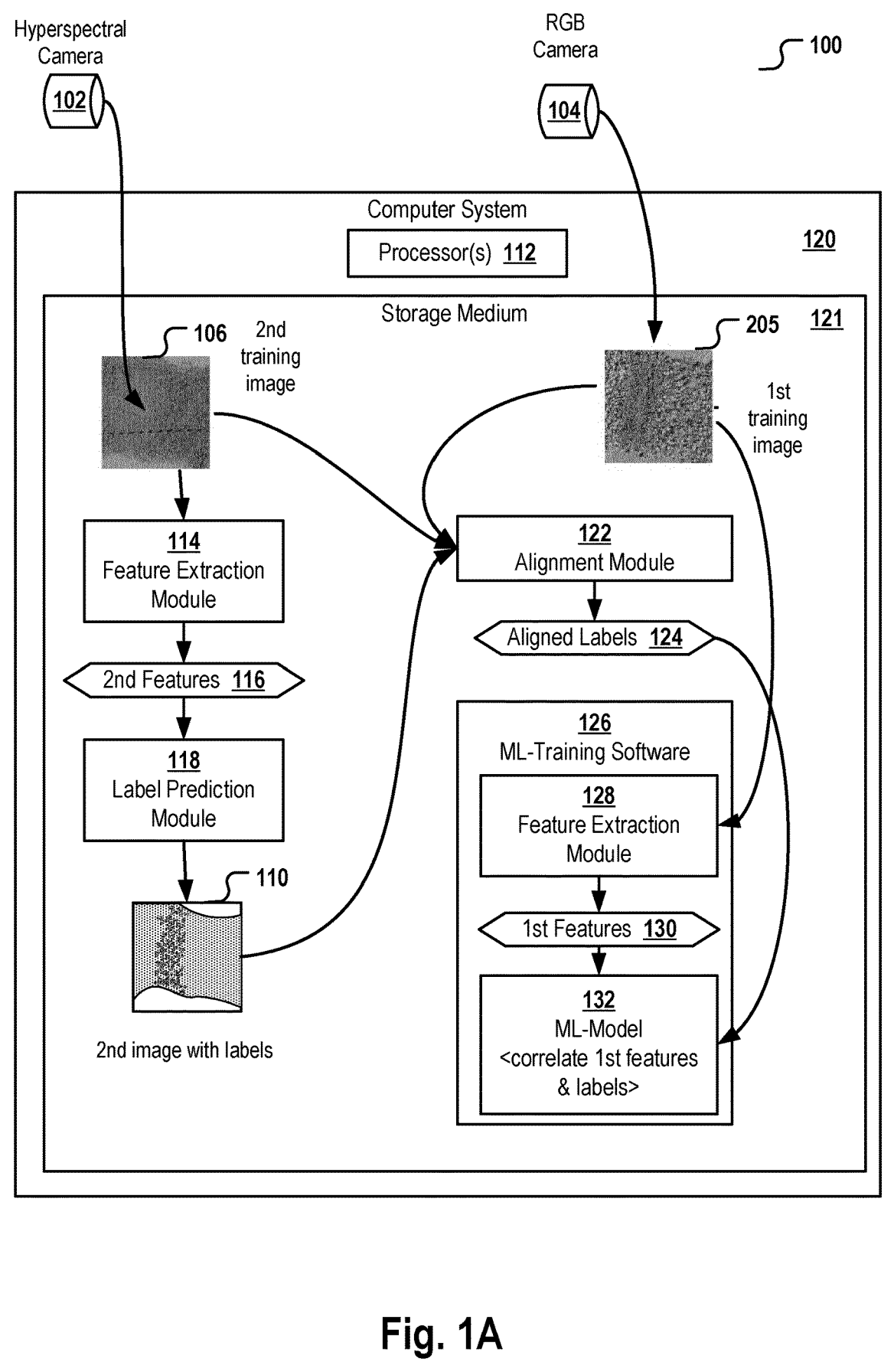

Hyperspectral Camera

102

RGB Camera

104

100

Computer System

Processor(s) 112

120

Storage Medium

106 2nd training image

205    121

1st training image

114
Feature Extraction Module

122
Alignment Module

2nd Features 116

Aligned Labels 124

118
Label Prediction Module

126
ML-Training Software

128
Feature Extraction Module

110

1st Features 130

132
ML-Model
<correlate 1st features & labels>

2nd image with labels

Fig. 1A

RGB
Camera

<u>104</u>

108

RGB
image

<u>202</u>
Prediction
Software

<u>206</u>

Hyperspectral
Camera

<u>102</u>

<u>302</u> hyperspectral
image

<u>114</u>
Feature Extraction
Module

2nd Features <u>116</u>

<u>118</u>
Label Prediction
Module

<u>304</u>

Training Phase

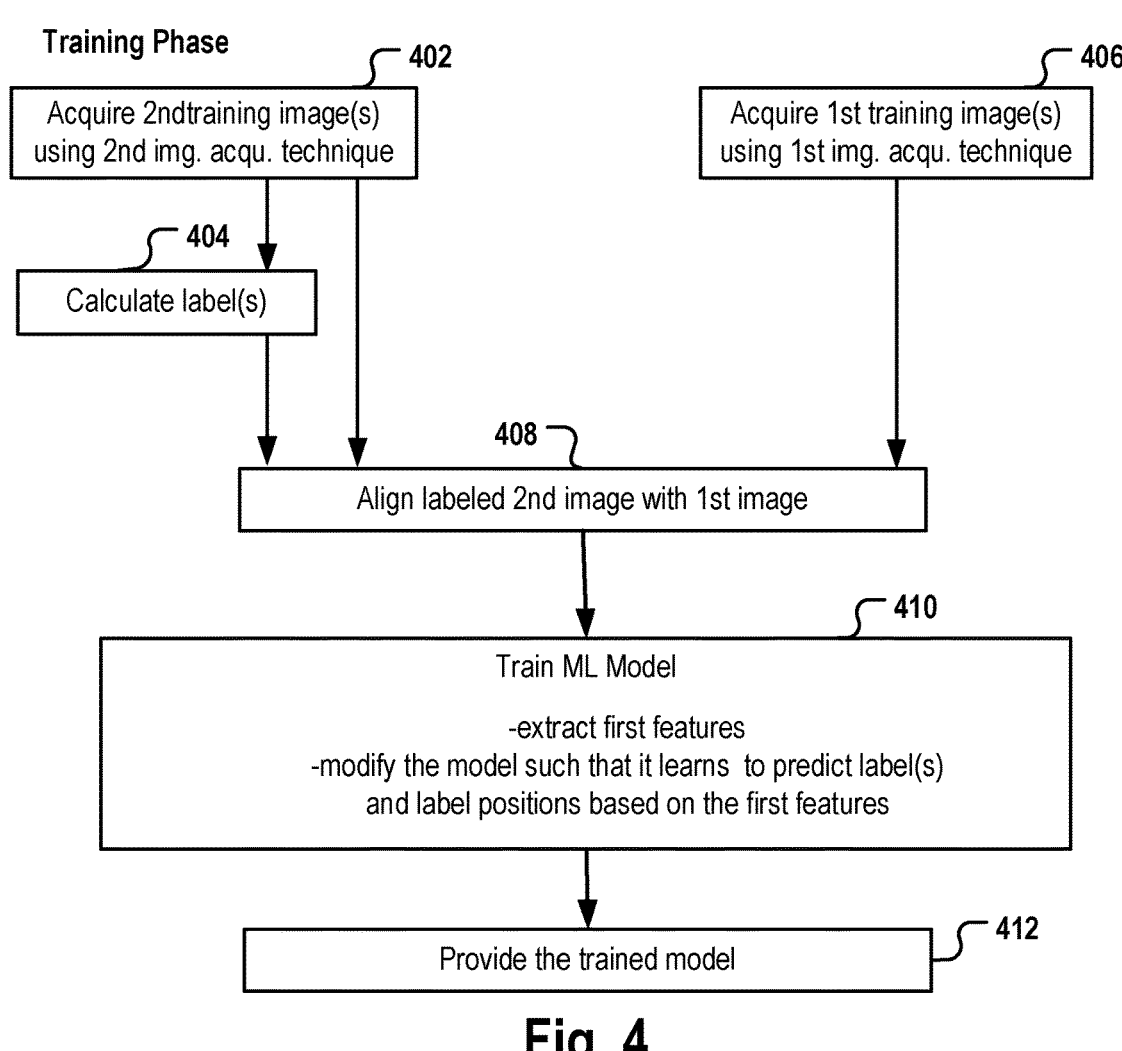

402
Acquire 2ndtraining image(s)
using 2nd img. acqu. technique

406
Acquire 1st training image(s)
using 1st img. acqu. technique

404
Calculate label(s)

408
Align labeled 2nd image with 1st image

410
Train ML Model

-extract first features
-modify the model such that it learns to predict label(s)
and label positions based on the first features 412
Provide the trained model

Fig. 4

Test/Prediction Phase

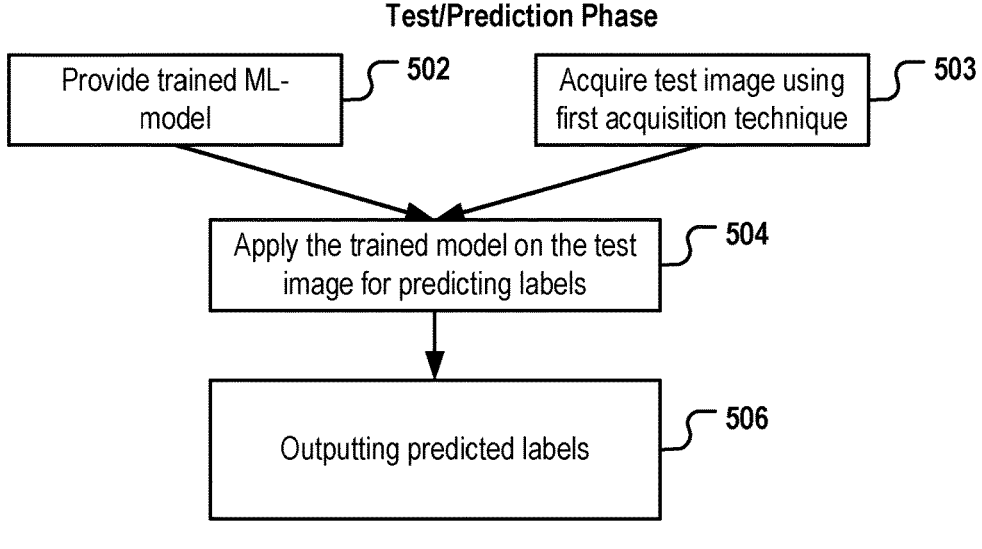

502
Provide trained ML-model

503
Acquire test image using first acquisition technique

504
Apply the trained model on the test image for predicting labels

506
Outputting predicted labels

Fig. 5

METHOD AND SYSTEM FOR AUTOMATED PLANT IMAGE LABELING

CROSS-REFERENCE TO RELATED APPLICATIONS

This application is a U.S. National Phase of International Patent Application No. PCT/EP2020/085953, filed on Dec. 14, 2020, which claims priority to European Application No. 19218722.7, filed Dec. 20, 2019. The entire contents of these applications are incorporated herein by reference in their entirety.

TECHNICAL FIELD

The present disclosure concerns a method and system for improving the labeling of images depicting plants and plant-related motives.

BACKGROUND

Spectral imaging is the detection of light reflected by an object with the use of specialized sensors. The reflected light is measured in spectral bands. Several spectral imaging approaches acquire light in many spectral bands and/or over a large range of the visible or invisible spectrum. In general, the higher the number of bands and the larger the spectral range covered, the higher the accuracy, the flexibility and information content of the acquired spectral images.

Spectral imaging is widely used now in agriculture and precision farming. For example, satellites and drone fitted cameras are using multispectral or hyperspectral imaging technology for acquiring images of the crop which comprise a high information content and hence allow performing various kinds of image analysis techniques.

For example, the patent application WO2017105177A1 describes a system for precision agriculture using maps of multispectral and hyperspectral images captured by means of high-speed and high-resolution photographic cameras mounted in the lower part of unmanned aerial vehicles which, in turn, are georeferenced.

In the field of precision farming, several image classification algorithms exist which are based on hyperspectral image data. However, hyperspectral and multispectral cameras are expensive. Furthermore, hyperspectral and multispectral cameras are often larger and/or heavier than RGB cameras, so the installation of such cameras on an existing but not very stable scaffold or building or on a drone is therefore often not possible or at least difficult or expensive. Meanwhile drones with a good RGB camera are available for the broad consumer market. The high quantities lead to a comparatively low price, whereas drones with hyperspectral cameras are often custom-made, serving only a small market and therefore being comparatively expensive.

Hence, the use of image data in precision farming and related technical domains is associated with the problem that existing image classification algorithms require hyperspectral image data as input, but the acquisition of this data is often much more expensive and technically complex than other, comparatively simple image acquisition techniques such as taking an RGB image with a standard camera. However, RGB images can usually not replace hyperspectral images, because their information content differs from the information content of hyperspectral images and therefore cannot be used as input of the existing hyperspectral image based image analysis approaches.

In order for machine learning systems/processes to generate high-quality models which are able to solve a predictive task accurately, they must be trained on a sufficiently large corpus of training data. If the data basis is too small or biased, the model obtained during training will have a poor generalization, a poor accuracy and will be unbalanced. However, the annotation of a sufficiently large corpus of trainings data needs a huge amount of labor. This is often a bottleneck for generating highly accurate ML-models which may be used for various predictive tasks such as semantic labeling of digital images.

Nguyen et al. in "Training-Based Spectral Reconstruction from a Single RGB Image", ECCV 2014, describes an automated reproduction of a hyperspectral image from an RGB image. At least in respect to some tasks like "scene illumination", the "computed" hyperspectral image can be used instead of a "real" hyperspectral image. However, as an RGB image covers only a small fraction of the spectrum of a hyperspectral image, the "computed" hyperspectral image may not allow accurately replacing a "real" hyperspectral image in other application scenarios. SUMMARY The invention provides for an improved method, computer program product and system for analyzing digital images depicting plant related motives as specified in the independent patent claims. Embodiments of the invention are given in the dependent claims. Embodiments of the present invention can be freely combined with each other if they are not mutually exclusive.

In one aspect, the invention relates to a computer-implemented method comprising:

acquiring first training images using a first image acquisition technique, each first training image depicting a plant-related motive, wherein the plant-related motive is selected from a group comprising: an indoor or outdoor agricultural area, a plant, a plant product, a part of the plant, a part of the plant product;

acquiring second training images using a second image acquisition technique, each second training image depicting the motive depicted in a respective one of the first training images;

automatically assigning at least one label to each of the acquired second training images;

spatially aligning the first and second training images which are depicting the same one of the motives into an aligned training image pair;

training a machine-learning model as a function of the aligned training image pairs and the labels, wherein during the training the machine-learning model learns to automatically assign one or more labels to any test image acquired with the first image acquisition technique which depicts a plant-related motive; and providing the trained machine-learning model.

This may be advantageous as embodiments of the invention allow providing a software (here: a trained machine-learning model) adapted to automatically compute and predicting labels based on easily acquirable digital images (obtained with the first image acquisition technique), thereby automatically predicting the value and position of one or more labels for the easily acquirable digital images even though high-quality digital images, e.g. hyperspectral images which are normally used for computing the labels, are not available.

Embodiments of the invention provide for a trained ML-model adapted to automatically predict and assign labels to any digital input image having been acquired using the first image acquisition technique. Hence, embodiments of the invention accelerate and ease the generation of labeled datasets which may be used for various purposes, e.g. may be used for assessing plant health or other phenotypic information. The manual creation of annotated training data is a highly time consuming, expensive and error prone process. Using information comprised in information-rich digital images acquired with a second, often complex and/or expansive image acquisition technique for automatically predicting the labels, and training a ML model on pairs of aligned first and second trainings images may have the advantage that a trained ML-model is generated that is adapted to automatically predict and generate those labels also based on first images having been acquired by a comparatively cheap/low-complexity first image acquisition technique. This may allow avoiding tedious and biased manual labeling, because a trained ML program is provided adapted to compute and assign the label fully automatically.

The provided trained ML model may allow generating precise spatial labels of images acquired using the first image acquisition technique based on learned correlations of image features of the first training images with labels assigned to second training images, whereby the labels of the training images were derived from spectral and/or spatial information comprised in the second training images which may be absent in the first training images. Learning this correlation between image features of images acquired with the first image acquisition technique with true labels derived from images acquired with the second image acquisition technique may allow circumventing time-consuming and potentially biased manual pixel-wise labeling of the first (training and test) images.

In precision farming and other related technical domains, the generation of labeled images as training data for various machine learning approaches is very time consuming. Embodiments of the invention use a trained ML-model for automatically creating the labels at test time. The trained ML-model can be created very quickly, e.g. automatically or semi-automatically. For example, second training images are acquired which comprise sufficient information for allowing a fast and automated label prediction and assignment. These labels are mapped to first training images depicting the same motive. The first training image and the labels are used as input for training the ML-model such that the model learns to predict the labels based on image features of the first training images. In other words, the second training images which can be labeled easily and fully automatically are used as input together with a first training image (which can be obtained cheaper, faster, etc.) for generating a trained model that is able to predict these labels based on digital images obtained via the first image acquisition method.

According to embodiments, the plant-related motive is a macroscopic motive of a size of at least 1 mm, in particular at least 1 cm.

According to embodiments, the acquiring of each of the first and of a respective one of the second training images are performed simultaneously or in close succession such that the optical sensors used for acquiring the first and second training images that later form one of the aligned image pairs have basically the same or a highly similar sensor position relative to the plant-related motive. In other words, the first and second training images depicting the same or a similar motive which are spatially aligned to each other during the training are images acquired at the same time or in close succession. Hence, the motive depicted in the first and second training image of each aligned image pair is identical or at least approximately identical.

According to embodiments, the first image acquisition technique can be a cheaper and/or technically less complex image acquisition technique than the second image acquisition technique. For example, the first image acquisition technique can be the acquisition of an RGB image and the second image acquisition technique can be the acquisition of a hyperspectral image.

According to embodiments, the assigning of the at least one label to each of the second training images is implemented such that to each pixel of the second training image a respective label is assigned. According to other embodiments, at least some of the labels are assigned to groups of pixels, e.g. to individual pixel blobs or image segments. According to still further embodiments, a single label is assigned ("globally") to the second training image.

According to embodiments, the label can comprise or consist of one or more data values of any type. For example, the label can comprise or consist of a Boolean value, a numerical value or an alphanumeric string. These labels can be used for indicating the membership of the pixel, pixel blob or image within a predefined class such as "soil", "healthy plants" or "infected plants".

According to embodiments, the trained ML-model is a model adapted to perform a predictive task, wherein the predictive task can be a regression problem or a classification problem.

According to embodiments, the predictive task comprises predicting the value and position of labels and assigning the labels to a digital image.

Each label can indicate, for example, a class name or a numerical value indicating a class membership likelihood or another parameter value that is of relevance for downstream image analysis operations. Class name labels can be used, for example, for image classification tasks. Numeric value labels can be used, for example, for regression tasks, either for the whole image, parts of the image, or for each individual pixel (e.g. semantic image segmentation which considers regions of adjacent pixels having the same or a sufficiently similar label as pixels belonging to the same segment).

For example, each label can be a number, e.g. an integer or a float. According to embodiments, the trained ML-model has learned and is configured to automatically assign these numerical values as labels to any input image acquired via the first image acquisition technique at test time. Hence, the trained ML has learned to automatically label input images with numeric values, e.g. percentage values. The labeled numerical values of one or more test images can be used for assessing plant health or other phenotypic information. For example, this assessment can be implemented as a regression problem making use of the automatically labeled test images. For example, the numerical value can be a value "68%" indicating the likelihood that a pixel, pixel blob or image depicts an object of a particular class, e.g. "soil".

According to another example, each label represents a name of a class comprised in a limited set of predefined classes. The classes can indicate classes of objects or motives to which an image, a pixel blob or an individual pixel belongs. For example, the class name can be specified in the form of a Boolean value (e.g. "true" for infected and "false" for "healthy") or a String ("healthy plant", "infected plant", "soil", "50% soil-50% healthy plant", "50% soil-50% infected plant") or a numerical value (e.g. %77% likelihood of belonging to the class "healthy plant"). According to embodiments, the trained ML-model has learned and is configured to automatically assign these predefined class names as labels to any input image acquired via the first image acquisition technique at test time. Hence, the trained ML has learned to automatically label input images with class names of one or more predefined classes. The labels assigned to one or more test images can be used as second-order training data provided as input to a further ML-program which learns to solve a classification problem based on the automatically labeled test images.

According to embodiments, the alignment of first and second training images depicting the same motive is performed manually. According to other embodiments, the alignment is performed using automated image alignment techniques such as, for example, image registration, photogrammetry, or georeferencing techniques. According to embodiments, the alignment can be performed based on a per-pixel basis.

According to embodiments, the spatially aligning of the first and second training images of each of the pairs comprises aligning the first and second images depicting the same motive based on their respective geopositions, thereby providing a roughly aligned image pair; and then refining the alignment as a function of pixel intensity and/or color similarities such that intensity-differences and/or color-differences between the first and second images are minimized for providing the alignment of the first and second image of the pair. The plant-related motive depicted in the test image is preferably similar to the plant-related motive depicted in the first and second training images. For example, if the training was performed on individual plants of a particular species, the test image should also be an image of a plant of the same or a similar species acquired at a similar relative position of optical sensor and plant. If the training was performed on an agricultural area, the test image should also be an image of an agricultural area acquired at a similar relative position of optical sensor and agricultural area and preferably under similar ambient light conditions.

According to embodiments, the method comprises using the trained machine-learning model for predicting one or more labels of the test image; and outputting the labeled test image.

These steps can be repeated for a plurality of test images acquired with the first image acquisition technique. Thereby, a large number of automatically labeled test images can be computed. This set of labeled images can be used for various purposes. For example, the labels can be used in order to perform an image segmentation of the test image for identifying regions in an agricultural area where water, fertilizer, pesticides and/or fungicides need to be applied or where a certain type of plant should be grown or harvested. The one or more labeled test images output by the trained ML model can also be used as training images for various second order machine learning tasks.

According to embodiments, the method further comprises extracting first features (also referred to as "image features") from each of the first training images. The training of the ML-model is performed such that the ML-model learns a spatial correlation of the first features and of the labels assigned to the second training images based on the spatial correlation of the first features and the labels within each of the aligned first and second training image pairs.

For example, the extraction of the features from each of the first training images can be performed by the machine learning program used for training the ML-model. For example, several neural network architectures which are available today and which can be used for image based machine learning tasks already comprise a large variety of image feature extraction algorithms that are applied on any input image in order to use the extracted first image features as input during the training. For example, various neural networks such as DeepLabv3+ comprise image feature extraction algorithms. During the training the ML-model learns a correlation of at least some of the automatically extracted first image features or of combination of those first image features with the content and position of the labels assigned to the second training images which have been aligned to the ones of the first training images depicting the same or approximately the same plant-related motive.

According to embodiments, the first features comprise one or more image features selected from a group comprising: an intensity value, an intensity gradient, a contrast, an intensity gradient direction, color indices and/or spectral indices, and linear as well as non-linear combinations of two or more of the aforementioned image features. According to some embodiments, the software program used for training the ML-model comprises one or more algorithms for automatically extracting a plurality of different image features from the image and during the training of the model, the model learns a subset of the first features and/or combinations of two or more of the first features which are particularly predictive in respect to a particular label aligned to the first training image.

According to embodiments, the method further comprises extracting second features (also referred to as "image features") from each of the second training images. The automatically assigning of the at least one label to each of the second training images comprises analyzing the second features extracted from the second training image for predicting the at least one label of the second training image as a function of the second features extracted from the second training image.

According to embodiments, the extraction of the second features is also performed by the ML-program used for training the ML-model. However, according to preferred embodiments, the extraction of the second image features from the second training images is performed by a separate feature extraction software program or module. This may be advantageous as the content and position of the label may vary strongly depending on the respective computational task, so the standard image feature extraction algorithms comprised in current machine learning frameworks may not cover the type of second image features needed to automatically predict the labels.

For example, the second training images can be hyperspectral images and the labels to be assigned to the second training images could be selected from a limited set of predefined class names listed below, wherein "S" represents "soil", "HP" represents "healthy plants" and "IP" represents "infected plants: "~100% S", "~100% HP", "~100% IP", "~50% S&~50% HP", "~50% S&~50% IP", "~50% IP&~50% HP", "~25% S&~25% HP~50% IP", "~25% S&~50% HP~25% IP", "~50% S&~25% HP~25% IP". Thereby, the label "~50% S&~50% HP" indicates that the image region having assigned this label depicts an agricultural area half covered with soil and half covered with healthy plants. The second features extracted from each of the second training image can for example be spectral signatures of pixels or pixel blobs. The extracted signatures can be compared with a set of predefined, known spectral reference signatures. Each spectral reference signature can be characteristic for a respective one of one or more of the above-mentioned classes. For example, there may exist a reference spectral signature for "100% S", i.e. a specific pattern of intensities across a wide spectral range which is characteristic for bare soil. In addition, there may exist a reference spectral signature for "100% HP", i.e. a specific pattern of intensities across a wide spectral range which is characteristic for healthy plants of a particular species. By comparing the extracted signatures ("second image features") with the reference spectral signatures, the one of the reference signatures being most similar to the extracted second feature can be identified and the class name of the class represented by this identified reference spectral signature can be used as the label assigned to the pixel or pixel blob from which the spectral signature was extracted.

According to embodiments, the plant-related motive is an indoor or outdoor agricultural area with multiple plants, a plant, a plant product, a part of the plant, a part of the plant product, whereby none of the plants or plant products has been modified, chemically treated and/or stained for providing labels or for facilitating the labeling.

Staining or chemically treating the plants in order to visualize some traits may not be necessary, because in particular hyperspectral reference signature may allow to detect basically any feature of a plant which has an effect on the way this plant absorbs or reflects light.

According to other embodiments, the second features comprise one or more image features selected from a group comprising: a spectral signature, spectral indices, spatio-spectral features (features which specify a relation between intensity and space, e.g. spectral gradients), intensity based features.

The number and type of the second features and hence also the algorithms used for extracting the second features are strongly dependent on the labels which shall be predicted based on the second features.

According to embodiments, the first and the second image acquisition technique are different image acquisition techniques, respectively, selected from a group comprising:

hyperspectral image acquisition;

RGB image acquisition;

monochromatic image acquisition; for example, the monochromatic image acquisition may comprise using a monochromator (an optical device that transmits a mechanically selectable narrow band of wavelengths of light or other radiation chosen from a wider range of wavelengths available at the input).

active image acquisition using an excitation light source;

multi spectral image acquisition; and

IR image acquisition.

According to embodiments, the automatic assigning of the labels to pixels or regions of each of the second training images comprises:

for each of a predefined set of motive classes, acquiring a spectral reference signature from a physical reference motive belonging to this motive class;

comparing the spectral reference signature with the second training images for identifying spectral similarities between pixels or regions of the second training images and the spectral reference signatures; and assigning, to each pixel or region of each of the second training images, a label being indicative of the one of the motive classes being spectrally most similar to this pixel or region.

Using spectral signatures extracted from the second training images and spectral reference signatures being characteristic for an object class of interest for predicting the labels may be advantageous as spectral signature are rich in information and can be acquired easily provided the image covers a sufficiently wide spectral range (this is in particular the case for hyperspectral and multispectral images). Hence, an accurate label prediction based on a single feature type may be provided. Using spectral signatures as second features for predicting the label takes advantage of the fact that certain objects or motives leave unique 'fingerprints' in the electromagnetic spectrum which are highly characteristic of an object class.

Furthermore, the method is highly flexible and can be used for automatically identify basically any type of object of interest without major adaptations to the feature extraction algorithm used for extracting the second features (here: spectral signatures). For example, in order to automatically detect plants of a particular species or a particular physiological state in a plurality of second training images, it may be sufficient to acquire one or more hyperspectral or multispectral reference images depicting an agricultural area covered with this particular plant. Then, a reference signature is extracted from those parts of the one or more reference images depicting these plants. The feature extraction step for extracting second features from the second training images comprises extracting spectral signatures at each pixel of each second training image and use them to divide the second training image in groups of similar pixels (segmentation) using different approaches. As a last step, a label, e.g. a class name, is assigned to each of the segments (or to each pixel in the segments) by comparing the signatures of each pixel (or an averaged spectral signature of the pixels of a segment) with the known spectral reference signature of the particular plant (or other object) of interest. Ultimately correct matching of spectral signatures in the pixels or segments of the second training images with the reference spectral signature leads to accurate prediction and assignment of labels to the second training images which indicate the presence of the above-mentioned plants of interest. This approach can easily extended to other object classes simply by adding an additional reference spectral signature to the reference spectral signature repository and take this additional reference spectral signature into account during signature comparison and label prediction.

Hence, using spectral signatures for label prediction may be beneficial as it is not necessary to define an algorithm that explicitly searches for colors, shapes, textures or other features considered by a programmer to be "characteristic" for a particular object. This may have the advantage that many "characteristic" features may not be comprised in the "visible" part of the spectrum and hence cannot be perceived by a human.

According to embodiments, the second image acquisition technique is hyperspectral image acquisition using a hyperspectral sensor.

This may have the advantage that the second training images are rich in spectral information. Spectral signatures derived for individual pixels of the second training images may hence be used for predicting a label indicating the type of object depicted by the image (or the likelihood of depicting this object type) highly accurately.

According to embodiments, the second image acquisition technique covers a larger portion of the whole electromagnetic spectrum (e.g. from below one hertz to above $10^{25}$ hertz) than the first image acquisition technique.

For example, the second image acquisition technique can be hyperspectral imaging or multispectral imaging while the first image acquisition technique can be RGB image acquisition or monochrome image acquisition. This may have the advantage that the second training images are rich in spectral information and hence provide a good basis for accurately predicting the label based alone or predominantly on spectral information, e.g. spectral signatures of individual pixels. Image acquisition techniques like RGB imaging or monochrome imaging have the advantage that the respectively used optical sensors are often cheap, mechanically robust, lightweight and/or have a high spatial resolution. Training the ML-model on a spatial assignment of labels predicted based on spectral information in the second training images to image features of the first training images hence provides a trained ML-model that is able to predict the labels based on features extracted from images having been acquired using a comparatively cheap image acquisition technique which may comprise less spectral information than images acquired using the second image acquisition technique.

According to embodiments, the second image acquisition technique covers a different portion (e.g. IR rather than UV or vice versa) of the whole electromagnetic spectrum than the first image acquisition technique.

According to embodiments, the second image acquisition technique is characterized by a higher information content per spatial area, in particular a higher spectral information content per spatial area, than the first image acquisition technique. For example, the second training images could comprise more "data layers", e.g. more spectral-band specific sub-images per area, than the first training images.

According to embodiments, the second image acquisition technique is characterized by a different information content per spatial area than the first image acquisition technique (e.g. spectral information relating to a different wavelength range in the electromagnetic spectrum).

According to embodiments, the first image acquisition technique has a higher spatial resolution than the second image acquisition technique.

According to embodiments of the invention, the second image acquisition technique is hyperspectral image acquisition technique and the first image acquisition technique is RGB image acquisition or multi-spectral image acquisition technique.

For example, for acquiring the first training images and/or the test image, a "standard" RGB camera of a smartphone, an RGB camera integrated in a drone used in precision farming, or an RGB camera integrated in a microscope used for acquiring magnified images of plants, plant products and parts thereof have a high spatial resolution can be used. The spatial resolution of these RGB cameras is larger (often by many orders of magnitude) than that of many hyperspectral cameras used e.g. for precision farming. This may be advantageous as the high information density in respect to spatial feature information comprises in the first training images may allow the ML-model to learn during the training to correlate spatial image features extracted in the form of first features from the first training images with spatially aligned labels having been predicted based on spectral information comprised in the second training images. Hence, the ML-program has "learned" during the training to predict the labels based on image features which are present only in the first training images but which are absent from (or have a reduced occurrence in) the second training images. Hence, according to embodiments, low-resolution hyperspectral images with high amount of spectral information are used to automatically predict labels which are then automatically aligned to high-resolution images with lower spectral information. Applicant has surprisingly observed that high-resolution images with little spectral information (such as RGB images or monochrome images) often contain features that allow successful training of an accurate ML model based on labeling data from a different image acquisition technique, e.g. hyperspectral imaging. Compared to existing approaches, like manual labeling, this needs much less manual labor and allows a (semi-) automatic workflow. For example, the status of disease progression inferred from a spectral signature, acquired at low resolution with a hyperspectral sensor, can be inferred as a result of the training process by the trained ML-model from changes in shape and/or color of objects in high-resolution RGB images.

According to embodiments, the first training images are RGB images. The second training images are hyperspectral images. The spatially aligning of the first and second training images of each of the pairs comprises:

for each pixel of the second training image, computing a red, a green and a blue intensity value by averaging spectral intensity values of respectively the visible red, green and blue spectral band covered by the second training image;

generating an RGB representation of the second training image as a function of the computed red, green and blue intensity values; for example, the RGB representation can be computed by combining these three red, green and blue intensity values into pixel-based tuples or preferably based on a more complex method like $r=R/(R+G+B)$, $g=G/(R+G+B)$, $b=B/(R+G+B)$;

computing a first greenness image, each pixel intensity of the first greenness image being a greenness index computed as a function of red, green and blue intensity values of the first training image;

computing a second greenness image, each pixel intensity of the second greenness image being a greenness index computed as a function of red, green and blue intensity values of the RGB representation of the second training image;

automatically performing the aligning of the first and the second training image such that differences of the greenness indices of the first and second images are minimized.

The greenness index highlights green motive components such as plants. The greenness can isolate green tissues from residue/soil background. It can be computed, for example, according to: Greenness=$2G-R-B$ or Greenness=$2G+B-2R$.

Using a greenness-index based image alignment may be beneficial, because the alignment procedure inherently focuses on the objects of particular interest, i.e., plants and plant parts typically having green color. Plants and plant parts are flexible objects whose exact outline may vary slightly e.g. depending on the wind and other parameters. Using a greenness index in the context of image alignment may hence be more suited for aligning image regions depicting plants and plant parts than e.g. alignment approaches based on GPS coordinates assigned to some pixels of the training images.

According to embodiments, the trained machine-learning model is configured to assigning the one or more labels to the test image such that at least one of the said labels is assigned to each pixel of the test image; and semantically segmenting the test image by grouping pixels of the test image sharing the same label or sharing a sufficiently similar label into the same segment.

For example, a "sufficiently similar" label can be a label for which a similarity value in respect to another label was computed, whereby the similarity value is above a predefined threshold. According to another example, the labels can be numerical values and two "sufficiently similar labels" can be labels lying within the same one of a set of predefined numerical ranges or can be labels whose number value difference is below a predefined threshold.

These embodiments of the invention may be advantageous as a trained model is provided that may be adapted to perform an image segmentation task quickly and accurately without relying on the acquisition of images using the second image acquisition technique. In a further beneficial aspect, the segmentation result may be compared with reference images comprising segmentation borders which are "known" to be correct may allow identifying biases in the trained model. For example, a model could be able to accurately identify "soil segments" and to identify "healthy plant segments" with high sensitivity in an image depicting an agricultural area. However, the trained model may sometimes erroneously consider areas depicting infected plants to be a "healthy plant" segment. By comparing the segments identified by the trained model with "reference segments" known to be correct, this "bias" in respect to the prediction results of the model can be identified. This is a major advantage over whole-image based classification systems which would only allow identifying overall accuracy. Moreover, the segments may be of high value for various downstream processing approaches, e.g. identifying sub-regions within agricultural areas which require irrigation or the application of a fertilizer, pesticide and/or herbicide.

According to embodiments, the trained machine-learning model is a neural network, in particular a neural network comprising at least one bottleneck layer. A bottleneck layer is a layer that contains few nodes compared to the previous layers. It can be used to obtain a representation of the input with reduced dimensionality. An example of this is the use of autoencoders with bottleneck layers for nonlinear dimensionality reduction.

According to embodiments, the motives depicted in the plant-related training and test images are the indoor and/or outdoor agricultural areas. The labels are selected from a group of predefined motive classes comprising:

area covered with healthy plants;
area covered with plants infected with a particular disease and/or parasite;
area covered with plants of a particular species;
area covered with plants of a particular variety (i.e., a sub-species);
area covered with plants treated with a particular substance, in particular a fungicide, pesticide, herbicide and/or fertilizer;
area covered with plants treated according to a particular irrigation schema;
area not covered with any plants;
area covered with a particular type of soil;
area covered with a mixture of predefined fractions of two or more of the aforementioned types of covering.

These features may be beneficial in particular in the context of precision farming. For example, for each of the above-mentioned labels and corresponding object classes, a respective spectral reference signature may be acquired empirically and stored in a storage medium operatively coupled to the computer comprising the processor(s) which perform the training of the ML-model. In addition, spectral reference signatures can be obtained empirically which correspond to mixed classes comprising objects of two or more of the above-mentioned classes in a certain ratio. For example, one of these additional spectral reference signature could be acquired from an agricultural area covered about by half with soil and by the other half with healthy plants. The trained ML-model can be used for automatically assigning labels being indicative of any one of the above-mentioned classes to test images acquired using the first image acquisition technique. For example, this may allow predicting if a particular agricultural area or sub-area needs to be irrigated, treated with fungicides, fertilizers, herbicides, needs to be harvested or needs to receive any other form of substance or treatment e.g. to improve crop yield and/or to fight infectious diseases or parasites.

According to other embodiments, the motives depicted in the plant-related training and test images are the plants, plant products and/or parts of the plant or of the plant product. The labels are selected from a group of predefined motive classes comprising:

surface area of a plant or of a product or part of this plant, whereby the surface area is healthy;
surface area of a plant or of a product or part of this plant, whereby the surface area shows symptoms associated with an infection of this area with a particular disease;
surface area of a plant or of a product or part of this plant, whereby the surface area shows an infection of this area with a particular parasite;
surface area of a plant or of a product or part of this plant, whereby the surface area shows a cell structure or organelle in a predefined amount range;
surface area of a plant or of a product or part of this plant, whereby the surface area shows a cell structure or organelle in a predefined state;
surface area of a plant or of a product or part of this plant, whereby the surface area shows morphological changes induced by local application of a particular substance;
surface area covered with a mixture of predefined fractions of two or more of the aforementioned types of surface areas.

These above-mentioned approach may be used for example for diagnostic purposes, e.g. for determining the disease or parasite having infected a particular plant or plant part. Alternatively, the method may be used for quality control of seeds and other forms of plant products, e.g. for ensuring that the seeds are free of infections and parasites and have a high likelihood of being able to germinate. The method may also be used for testing if a particular pesticide or fungicide that was locally applied is effective.

According to embodiments, the automatically labeled test images are processed for identifying plants which comprise one or more desired or undesired traits and selectively using plants having the desired trait and/or lacking an undesired trait in a plant breeding project.

In a further aspect, the invention relates to a computer-implemented method for automatically assigning one or more labels to a test image acquired using a first image acquisition technique. The test image depicts a plant-related motive. The method comprises:

providing a trained machine-learning model, the trained machine learning model being adapted to automatically predict one or more labels to be assigned to any input image acquired with the first image acquisition technique and depicting a plant-related motive,
using the trained machine-learning model for predicting the one or more labels of the test image; and
outputting the predicted labels of the test image.

This may be advantageous because even in case the second image acquisition technique that was used for generating the second training images is not available (e.g. because the respective camera is too expensive, too complex to use or maintain or too heavy to install it on a drone), the trained ML-model is nevertheless able to automatically predict the labels for the test image although the test image was acquired using the first image acquisition technique.

According to embodiments, the trained machine learning model is adapted to automatically predict the one or more labels based on a learned spatial correlation of first features having been extracted from first training images acquired with the first image acquisition technique, and labels assigned to second training images, the second training images showing the same motives as the first training images and having being spatially aligned to the first training images.

The expression "the same motive" as used herein according to embodiments of the invention means "at least approximately the same", because in many real-world application scenarios, first and second training images of the same motive are taken in close temporal succession, e.g. within less than one hour, preferably less than 20 minutes, preferably less than 5 minutes, still preferably less than 5 seconds delay. However, this short time period may cause small absolute changes in the position of plants and plant parts caused by the wind or other environmental factors or may cause small relative changes between the positions of the depicted motive and a moving camera used for acquiring the first and second training images. However, as these differences are typically small, the motives depicted in the first and second training image taken in close temporal proximity and which are spatially aligned to a pair of training images can be considered to be at least approximately identical.

According to embodiments, the method further comprises generating the trained machine-learning model in accordance with the method according to any one of the embodiments described herein.

In a further aspect, the invention relates to an image analysis system. The image analysis system comprises at least one processor and a volatile or non-volatile storage medium. The storage-medium comprises computer-interpretable instructions which, when executed by the at least one processor, cause the processor to perform the computer-implemented method any one of the embodiments described herein.

For example, the image analysis system can be a standard computer, e.g. a Desktop computer, or a distributed computer system, e.g. a cloud computer system.

The image analysis system can comprise an interface for receiving the first and second training images and/or for receiving one or more test images acquired using the first image acquisition technology. For example, the interface can be a network interface for receiving the images from another computer system. Alternatively, the interface can be a USB interface for receiving the images via an USB storage device. In addition, or alternatively, the image acquisition system can be operatively coupled to one or more optical sensors configured to acquire the first and/or second training images and/or configured to acquire the one or more first test images. The image analysis system can be used both for training the ML-model and for applying the trained ML-model on the one or more test images. Alternatively, different image analysis systems are used for training the ML-model and for applying the trained model on the one or more test images. In this case, each of the image analysis systems can have the above-described features. The image analysis system used for training the ML-model preferably comprises a software application for extracting the second features from the second training images, a software for predicting the labels as a function of the second features, and for spatially aligning pairs of first and second training images (including their labels) depicting the same plant-related motive. The image analysis system used for training the ML-model and/or for applying the trained ML-model comprises software for extracting first features from any image acquired using the first image acquisition technique which has been input to the ML-model. In some embodiments, the software for extracting the first features can be an integral part of the machine learning software used for generating the trained ML-model.

A "plant product" can be, for example, one or more seeds, one or more fruits, cuttings, a tuber, a bulb, an onion, a bean, etc.

A "training image" as used herein is a digital image used for training an ML-model. To the contrary, a "test image" as used herein is a digital image used at test time ("prediction time") as input to the already trained model. While the training images are provided to the model to be trained in association with labels considered to be correct ("ground truth"), the test image is provided to the trained ML-model without any label assigned. Rather, it is the task of the trained ML-program to calculate and predict the labels and label positions correctly.

A "spectral signature" as used herein is the variation of reflectance or emittance of a material with respect to wavelengths (i.e., reflectance/emittance as a function of wavelength). For example, the spectral signature of a particular object, e.g. soil, a plant of a particular species, a plant in a particular physiologic state, etc., may be characteristic for this particular object type or the object's state. The spectral signature of an object is a function of the incidental electromagnetic wavelength and material interaction with that section of the electromagnetic spectrum. According to embodiments, a spectral signature of an object depicted in a digital image can be extracted in the form of an image feature for each pixel, e.g. for segmentation purposes, or for groups of pixels, e.g. blobs.

As a last step, they assign a class to each group (classification) by comparing with known spectral signatures. Depending on pixel resolution, a pixel can represent many spectral signature "mixed" together—that is why much remote sensing analysis is done to "unmix mixtures". Ultimately correct matching of spectral signature recorded by image pixel with spectral signature of existing elements leads to accurate classification in remote sensing.

A "spectral reference signature" as used herein is a spectral signature taken from an object which is regarded as a typical representative of a class of objects. For example, the software used for predicting the labels of the second training images can comprise a repository with spectral reference signals. A first one of the reference signals comprises a hyperspectral signature having been derived from an image depicting an agricultural area covered with bare soil. A second one of the reference signals comprises a hyperspectral signature having been derived from an image depicting an agricultural area covered with healthy plants of a particular species. A third one of the reference signals comprises a hyperspectral signature having been derived from an image depicting an agricultural area covered with plants of a particular species infected with a particular disease or parasite. Further ones of the reference signals respectively comprise a hyperspectral signature having been derived from an image depicting an agricultural area covered with a particular mixture of two or more of the above mentioned categories "soil", "healthy plants" and "infected plants".

The term "Machine learning (ML)" as used herein refers to the study, development or use of a computer algorithm that can be used to extract useful information from training data sets by building probabilistic models (referred to as machine learning models or "predictive models") in an automated way. Machine learning algorithms build a mathematical model based on sample data, known as "training data", in order to make predictions or decisions without being explicitly programmed to perform the task. The machine learning may be performed using a learning algorithm such as supervised or unsupervised learning, reinforcement algorithm, self learning, etc. The machine learning may be based on various techniques such as clustering, classification, linear regression, support vector machines, neural networks, etc. A "model" or "predictive model" may for example be a data structure or program such as a neural network, a support vector machine, a decision tree, a Bayesian network etc. or parts thereof adapted to perform a predictive task. The model is adapted to predict an unknown value (e.g. a label and/or a label position) from other, known values.

For example, the ML-model can be a predictive model that has learned to perform a predictive task such as classification or regression. Classification is the problem of predicting a discrete class label output for an input, e.g. a test image or part thereof. Regression is the problem of predicting a continuous quantity output for an input.

A "hyperspectral image acquisition technique" as used herein is an image acquisition technique that collects and processes information from across the electromagnetic spectrum. The goal of hyperspectral imaging is to obtain the spectrum for each pixel in the image of a scene, with the purpose of finding objects, identifying materials, or detecting processes. In hyperspectral imaging, the recorded spectra have fine wavelength resolution and cover a wide range of wavelengths. Hyperspectral imaging measures continuous spectral bands, as opposed to multispectral imaging which measures spaced spectral bands. According to embodiments, hyperspectral sensors are adapted to capture electromagnetic signals within narrow spectral bands over a continuous spectral range, producing the spectra of all pixels in the scene. A sensor with only 20 bands can also be hyperspectral when it covers the range from 500 to 700 nm with 20 bands each 10 nm wide. (While a sensor with 20 discrete bands covering the visible, near, short wave, medium wave and long wave infrared would be considered multispectral). Hyperspectral imaging (HSI) uses continuous and contiguous ranges of wavelengths (e.g. 400-1100 nm in steps of 1 nm) whilst multispectral imaging (MSI) uses a subset of targeted wavelengths at chosen locations (e.g. 400-1100 nm in steps of 20 nm).

Multispectral image acquisition techniques (acquiring 5-7 bands) have been observed to offer a good overview of crop such as overall growth, but sometimes fail to tackle more complex problems such as the identification of weeds or of certain diseases or parasites. Hyperspectral technology with its higher detection capabilities due to higher number of spectral bands can be used for almost any problem encountered in the field of precision farming and related fields.

An "RGB image acquisition technique" as used herein is any image acquisition technique that uses a camera or video-camera for providing digital images, wherein each pixel has assigned a red (R), green (G) and blue (B) intensity value. For example, a digital camera that use a CMOS or CCD image sensor that comprises three different sensors for the three spectral ranges corresponding to red, green and blue light of the visible spectrum can be used for obtaining an RGB image. Some RGB image acquisition systems can use a Bayer filter arrangement wherein green is given twice as many detectors as red and blue (ratio 1:2:1) in order to achieve higher luminance resolution than chrominance resolution. The sensor has a grid of red, green, and blue detectors arranged so that the first row is RGRGRGRG, the next is GBGBGBGB, and that sequence is repeated in subsequent rows. For every channel, missing pixels are obtained by interpolation to build up the complete image. Also, other processes can be applied in order to map the camera RGB light intensity measurements into a standard RGB color space.

A "multi spectral image acquisition technique" as used herein is an image acquisition technique that is adapted to capture images at discrete and comparatively narrow bands. Being "discrete and comparatively narrow" is what distinguishes multispectral imaging in the visible wavelength from color photography. A multispectral sensor may have many bands covering the spectrum from the visible to the longwave infrared. Multispectral images do not produce the "spectrum" of an object.

A "monochromatic image acquisition technique" as used herein is an image acquisition technique that is adapted to provide digital images having a single "color" channel. According to some approaches, a camera is used for capturing a monochromatic image which is adapted to selectively sense light signals within a single and preferably narrow spectral band. According to other embodiments, the camera is adapted to capture electromagnetic signals of a wide spectral range, whereby the captured intensity information is further processed for generating a monochromatic image. For example, the further processing can comprise applying one or more optical filters for filtering out all but this single spectral band from a multispectral/wide-spectral image. For example, the single spectral band can cover a comparatively narrow spectral range that covers wavelength differing from the median wavelength of this range by less than 5%.

An "IR image acquisition technique" as used herein is an image acquisition technique that is conducted with an instrument called an infrared spectrometer (or spectrophotometer) to capture an infrared spectrum of an object or scene. The infrared portion of the electromagnetic spectrum covered by the IR image acquisition technique according to embodiments of the invention can cover the near-infrared (0.7-2.5 μm wavelength), mid-infrared (2.5-25 μm) and/or far-infrared (25-1000 μm).

An "active image acquisition technique" as used herein is any image acquisition technique, including any one of the above-mentioned image acquisition techniques, that uses an excitation light source to illuminate a scene whose image is to be captured. For example, the excitation light source can be an UV-light source that is configured to emit UV-pulses on the plant-related motive, e.g. a whole plant, seed, or part thereof. The UV-pulses can induce a fluorescence signal that is captured by an intensified CCD-camera. For example, active imaging can be used for fluorescence imaging of plants, in particular multispectral fluorescence imaging in the maxima of the fluorescence emission bands of leaves, i.e., in the blue (440 nm), green (520 nm), red (690 nm), and far-red (740 nm) spectral regions. For example, blue-green fluorescence derives from ferulic acids covalently bound to cell walls, and the red and far-red fluorescence comes from chlorophyll a in the chloroplasts of green mesophyll cells. The fluorescence intensities are influenced (1) by changes in the concentration of the emitting substances, (2) by the internal optics of leaves determining the penetration of excitation radiation and partial re-absorption of the emitted fluorescence, and (3) by the energy distribution between photosynthesis, heat production, and emission of chlorophyll fluorescence and hence provide valuable information on the health status of plants. Active imaging using e.g. an UV excitation light source can be applied for near-distance screening or remote sensing in the context of precision farming and related fields.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

BRIEF DESCRIPTION OF THE DRAWINGS

In the following, only exemplary forms of the invention are explained in more detail, whereby reference is made to the drawings in which they are contained. They show:

FIG. 1A a block diagram of a system used for generating a ML-model having learned to label RGB images;

FIG. 4 a flowchart of a method for providing a trained ML-model adapted to automatically label images acquired with a first image acquisition technique;

FIG. 5 a flowchart of a method for using the trained ML-model for automatically labeling images acquired with a first image acquisition technique.

DETAILED DESCRIPTION

Figures 1B, 2:
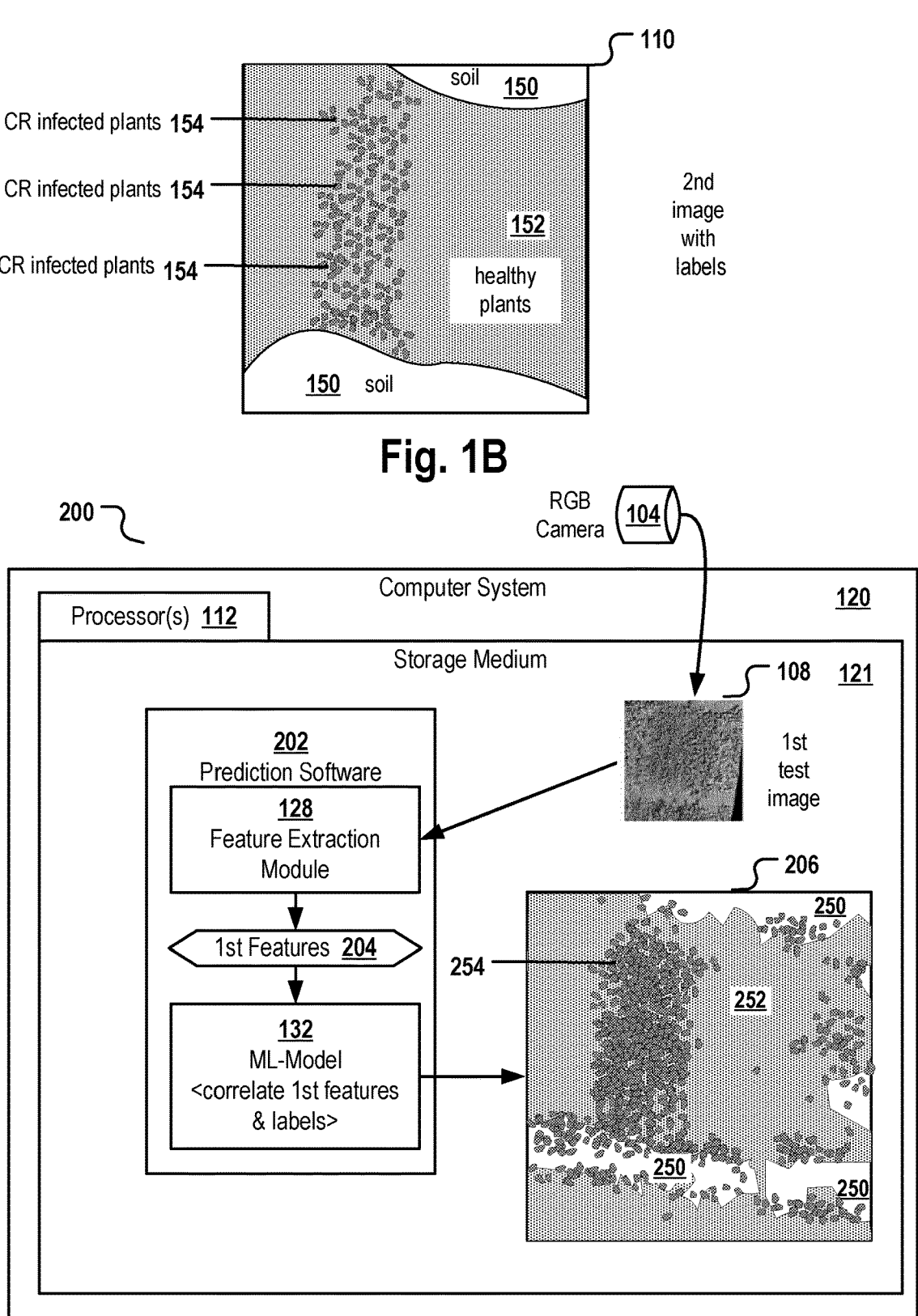
FIG. 1B an automatically labeled hyperspectral training image.
FIG. 2 a block diagram of a computer system used for predicting labels for an RGB test image using the trained ML-model.

FIG. 1A shows a block diagram of a system 100 used for generating a ML-model 132 having learned to label RGB images. The model to be generated shall be able to automatically identify and label sugar beet plants infected with a particular disease or parasite, e.g. Cercospora, based on RGB images which can be acquired easily with standard cameras. Cercospora is a genus of ascomycete fungi. Most species of this genus cause plant diseases, and form leaf spots.

The system comprises a computer system 120, e.g. a standard Desktop computer system, one or more RGB cameras 104 adapted to acquire digital RGB images of a test field with sugar beet plants infected with Cercospora, and one or more hyperspectral cameras 102 adapted to acquire digital hyperspectral images of this test field. The use of the RGB camera 104 is referred to as the "first image acquisition technique" and the use of the hyperspectral camera 102 is referred to as the "second image acquisition technique".

The hyperspectral camera 102 and the RGB camera 104 are positioned in close spatial proximity to each other such that both depict the test field from basically the same distance and angle. Alternatively, the two camera types 102, 104 are positioned on the same place and are used sequentially for acquiring images.

In one embodiment, HySpex Mjolnir was used as hyperspectral camera 102 and Sony Alpha 7rII was used as the RGB camera 104. An unmanned aerial vehicle (UAV), e.g. a drone, was equipped with both cameras 102 104.

Hyperspectral images 106 acquired by the hyperspectral camera 102 and the RGB images 205 acquired with the RGB camera were individually georeferenced on basis of a high precision GNSS-aided IMU (wherein GNSS refers to global navigation satellite system and IMU to Inertial measurement unit). An IMU is an electronic device that measures and reports an object's specific force, angular rate, and sometimes the orientation of the body, using a combination of accelerometers, gyroscopes, and sometimes magnetometers. Using an IMU-enabled GPS devices may allow the GPS receiver to work when GPS-signals are unavailable, e.g. when electronic interference is present.

The acquired images 106, 205 are transferred to the computer system 120 and stored in the storage medium 121. The storage medium 121 is preferably a non-volatile storage medium, e.g. an electromagnetic or optical storage medium, e.g. a hard disc drive, a DVD, or the like. The transfer can be performed via a mobile telecommunication connection while the UAV is flying over the field. Alternatively, the transfer can be performed after the UAV has landed, e.g. by transferring an SD-card, USB-storage device or other type of portable storage device of the UAV manually to the computer system 120. The hyperspectral images 106 are used as second training images and the transferred RGB images 205 are used as first training images during the training of the ML-model.

The computer system 120 comprises one or more processors 112 configured to instantiate and run one or more software programs or modules 114, 118, 122, 126 involved in generating the trained model 132.

For example, a feature extraction module 114 is configured to extract image features referred herein as second features 116 from each pixel of each second training image 106. The second feature preferably consists of or comprises a spectral signature. For example, the spectral signature can be a curve indicating light intensity observed at the wavelength continuum of the spectrum covered by the hyperspectral sensor.

A label prediction modules 116 is configured to receive the extracted second features as input and to compute one or more labels for each second training image 106. For example, the label prediction module 118 can comprise a repository comprising a plurality of reference spectral signatures. Each reference spectral signature is descriptive of the spectral signature characteristic for a particular type of object. For example, the repository can comprise a hyperspectral reference signature characteristic for plain soil, a hyperspectral reference signature characteristic for healthy sugar beet plants, a hyperspectral reference signature characteristic for sugar beet plants infected with Cercospora, a hyperspectral reference signature characteristic for a 50:50 mixture of healthy and Cercospora-infected sugar beet plants, etc. By comparing the spectral reference signature stored in the repository of module 118 with the spectral signatures of expects in each second training image, the module 118 can identify the one of the reference spectral signature being most similar to the spectral signature of the respective pixel. The class name of this "most similar reference spectral signature" of the pixel in the second training image is assigned to this pixel. Alternatively, a numerical value being indicative of a likelihood that the pixel in the second training image depicts the type of objects represented by the "most similar reference spectral signature" is assigned as a label to the pixel of the second training image.

The label prediction module 118 outputs a labeled second training image 110 for each of the second training images 106.

An alignment module 122 is configured to spatially align first and second training images depicting the same or basically the same motive. For example, the alignment can be performed based on GPS coordinates assigned to the images by the cameras 102, 104 or could be based on the known camera parameters such as the known, fixed camera positioning relative to the motive and/or relative to the other type of camera. In addition, or alternatively, a greenness index can be computed and used as a basis for aligning the first and second training images. The label prediction module 118 can compute and assign at least one label to each of the second training images (or to a subregion thereof, e.g. a pixel blob or an individual pixel) before or after the alignment module performs the image alignment.

According to embodiments wherein the labels are assigned to individual pixels or pixel blobs, the alignment module inherently also spatially aligns the labels which are or will be assigned to pixels or pixel regions of the second training images to respective pixels or pixel regions of the first training images.

The aligned labels 124, i.e., the content of the labels and also the an indication of the one or more pixels of the first training image to which the label is aligned, are input together with the first training image 205 to which the labels have been aligned into a software 126 configured for training the machine learning model. For example, the software 126 can comprise a module 128 comprising a plurality of algorithms for extracting features 130 from each of the first training images. In addition, the software 126 can comprise additional algorithms and modules needed during training. For example, the software 126 can comprise a loss function that is configured to compare labels predicted by the ML-module 132 based on extracted first features 130 during the training with the labels 124 provided as training data during the training and to adapt the model 132 such that the deviation of the predicted first labels and the provided "true" labels 124 is minimized. For example, the software Deep-Labv3 can be used as training software. DeepLabv3 is a state-of-art deep learning software specifying a deep learning model for semantic image segmentation, where the goal is to assign semantic labels being indicative of e.g. a class membership to every pixel in the input image. DeepLabv3 comprises several image feature extraction algorithms and comprises further modules adapted to train a ML-model based on the extracted first features and additional training data provided by the user.

Preferably, the training data used for training the ML-model 132 comprises several hundred or preferably several thousand first training images and a corresponding number of second training images which are aligned to each other to form several hundred or preferably several thousand pairs of aligned training images.

FIG. 1B depicts an automatically labeled hyperspectral training image generated by a system according to embodiments of the invention in greater detail. Initially, the label prediction module 118 assigns a label to each individual pixel of a second training image 106. In the depicted example, only three different labels are used: a label 150 indicating soil, a label 152 indicating healthy sugar beet plants, and a label 154 indicating sugar beet plants infected with *Cercospora*. After the alignment module 122 has performed the image alignment, the labeled second training image or a combination only of the labels and the label position information can be provided as input to the machine learning training software 126.

FIG. 1B depicts a graphical representation of the labeled second training image wherein different sub-regions of the image have been identified by applying a segmentation algorithm that groups pixels having identical or similar labels into the same segment. For example, the segmentation algorithm has identified to image regions 150 respectively depicting soil, a large image region 152 depicting healthy sugar beet plants, and a plurality of image patches 154 respectively depicting sugar beet plants infected with *Cercospora*. Applying an image segmentation algorithm and representing different segments with different colors or hatching may be advantageous, because this graphical representation eases interpretation of the label predictions by humans. For example, the labeled and segmented image 110 can be output to a user via a screen or a printout.

FIG. 2 a block diagram of a computer system 120 used for predicting labels 150, 152, 154 for an RGB test image 108 using the trained ML-model 132.

The computer system 120 can be the same computer system used for performing the training. Alternatively, the computer system can be any other computer system, e.g. a cloud computer system or a desktop computer system, to which the trained ML-model has been transferred.

The computer system used for applying the trained ML-model at test time comprises a storage medium 121 and one or more processors 112 which are identical to or functionally equivalent to the storage medium and processes described already with reference to FIG. 1A. The computer system 120 comprises a prediction software 202 with a feature extraction module 128 and the trained ML-model 132. The feature extraction module is configured to extract the same type of image features which were extracted as "first features" during the training of the ML-model. The feature extraction module 128 can be an integral part of the prediction software 202 or can be a separate software application or module configured to preprocess any received test image 108 for extracting the first features 204 and provide the first features as input to the prediction software 202.

The storage medium comprises one or more test images 108 respectively having been acquired using the first image acquisition technique. In the examples depicted in FIG. 1 and two, the first image acquisition technique is an RGB image acquisition technique. The test images can be received from a different computer via a network, can be read from a local or remote storage medium, e.g. an USB storage device, and/or can be directly received from an RGB camera 104. The RGB camera 104 can be a different RGB camera than the one depicted in FIG. 1A and the identical reference numbers merely indicate functional equivalence.

Each RGB test image 108 is provided as input to the prediction software 202. the feature extraction module 128 extracts a plurality of first features 204 from each RGB test image. For example, the first image features 204 can comprise intensity gradients, textures and other patterns, intensity values, color values, color gradients, contrast values, etc. The extracted first features 204 are provided as input to the trained ML-model 132. During the training, the model has learned spatial correlations between labels and first image features extracted from the RGB training images. Hence, based on the first features 204 provided by the feature extraction module 128, the trained ML-model 132 is able to predict at least one label and a corresponding label position for each RGB test image 108. For example, in some embodiments, only a single label per image is predicted. Preferably, the labels are predicted for each pixel in the RGB test image.

The labeled test image 206 depicts image segments obtained by segmenting the test image 206 based on the pixel-wise labels predicted by software 202. The labeled and segmented test image 206 comprises several subregions indicated by white color which have assigned a label 250 indicating soil. The image 206 further comprises a large region indicated by a first hatching which has assigned a label 252 indicating healthy sugar beet plants and a plurality of small image patches indicated by a second, dark hatching which have assigned a label 254 indicating sugar beet plants infected with *Cercospora*.

Figure 3:
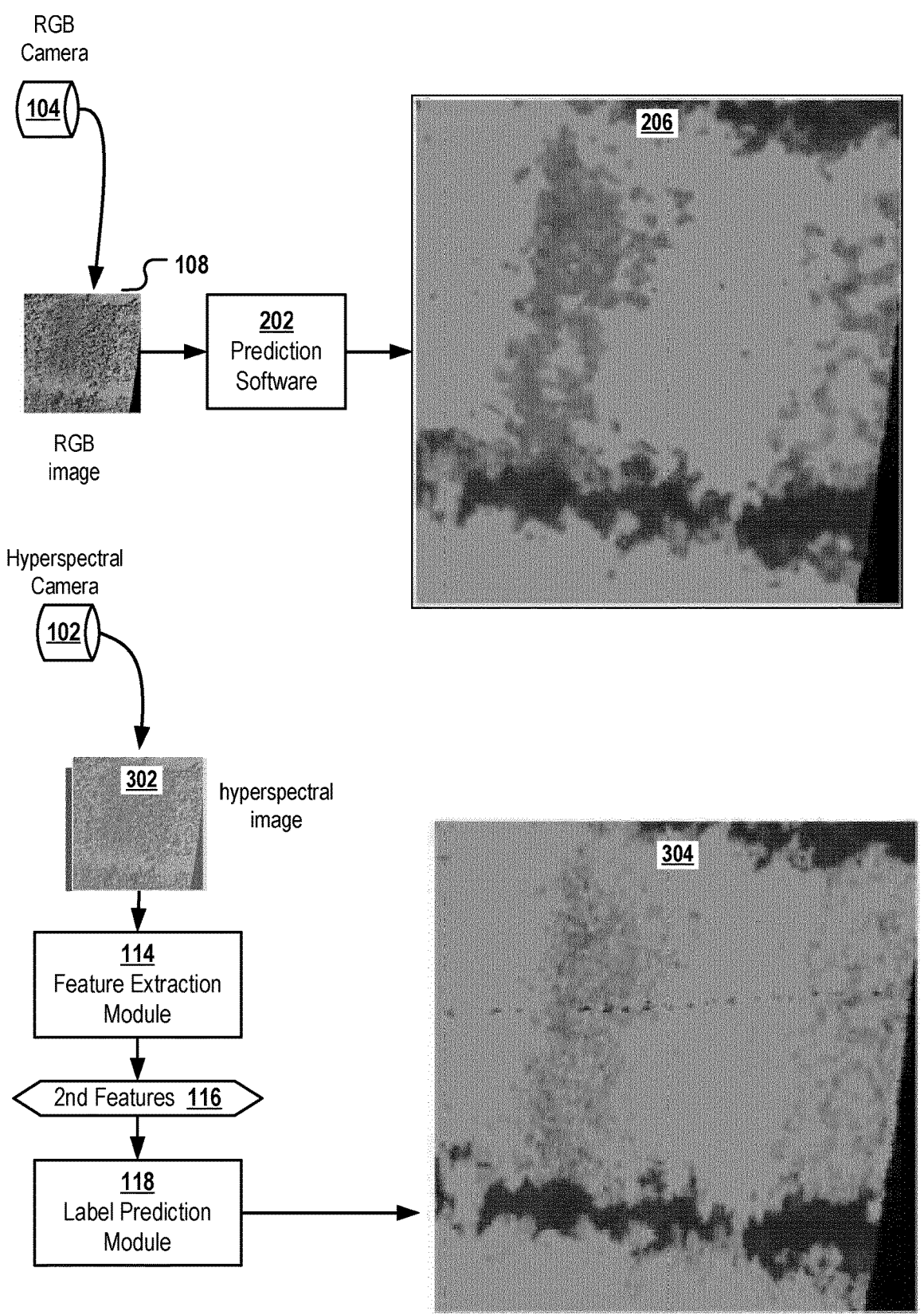
FIG. 3 an RGB test image that was automatically labeled by the trained model and a hyperspectral image that was automatically labeled based on its spectral signatures.

FIG. 3 depicts the RGB test image 206 that was automatically labeled by the trained model in greater detail, whereby different image segments having assigned different labels are represented by different colors instead of different hatchings.

To illustrate the accuracy of the proposed label prediction approach, the lower part of FIG. 3 illustrates the labels obtained for the same test field based on a hyperspectral camera and a label prediction software that uses hyperspectral signatures for predicting the labels. The hyperspectral camera 102 is used for acquiring a hyperspectral image 302 that depicts the same agricultural area as depicted in the test image 108. A comparison of the RGB test image 108 and the hyperspectral test image 302 reveals that both images depict the same agricultural area. Of course, the spectral information outside of the visible spectral range that is comprised in the hyperspectral image 302 cannot be illustrated here. By applying the feature extraction module 1144 extracting second features 116 in the form of spectral signatures and by comparing the extracted spectral signatures of each pixel with respective reference spectral signatures, pixel specific labels can be computed by the label prediction module 118 as described before. By performing an image segmentation step based on the said labels, the labeled and segmented hyperspectral image 304 is generated. A comparison of the two labeled images 206, 304 reveals that the trained ML-model is able to predict the type and position of labels with basically the same accuracy as the label prediction module 118 that uses hyperspectral data as input. Hence, although the RGB camera used for acquiring the first test image covers only a smaller spectral range, the trained ML-program is able to accurately predict the location and type of labels. Hence, the method for automatically labeling test images having been acquired with a first image acquisition technique by using a ML-model having been trained on an automatically generated labels of hyperspectral images combines the advantages of RGB and hyperspectral imaging techniques: hyperspectral images are highly flexible and allow automatically identifying basically any kind of object based on information rich spectral signatures. RGB images can be acquired by standard, cheap RGB cameras. By using hyperspectral images only at training time but using RGB images for performing automated labeling at test time, the costs and effort associated with using hyperspectral cameras only occurred during the training phase, not during the test phase.

FIG. 4 a flowchart of a method for providing a trained ML-model adapted to automatically label images acquired with a first image acquisition technique, e.g. RGB imaging.

For example, the method can be performed by a system depicted in FIG. 1A.

First in step 402, the method comprises acquiring a plurality of second training images 102 using a second image acquisition technique, e.g. a hyperspectral camera 102. In addition, the second image acquisition technique can be used for acquiring reference spectral signatures of objects of one or more different object classes of interest. For example, hyperspectral reference signatures of soil, healthy sugar beet plants and of sugar beet plants infected with *Cercospora* can be acquired.

Next in step 404, at least one label is calculated for each of the second training images 106. For example, a feature extraction module 114 extracts a spectral signature for each pixel in each of the second training images and uses them a second features 116. The extracted spectral signatures are compared with the spectral reference signatures for determining the one of the reference spectral signatures being most similar to the spectral signature of the currently examined pixel. The object class represented by identified most similar reference signature is assigned in the form of the at least one label to each of the second training images. For example, a label can be assigned to each pixel of each second training image.

According to one embodiment, each of the hyperspectral second training images was compared with the above-mentioned hyperspectral reference signatures to calculate a per-pixel similarity score for the spectra of soil, healthy plants, and *Cercospora* infested plants using a spectral angle mapper algorithm. According to embodiments, spectral reference signature for the above mentioned three classes were obtained empirically, In addition, further 13 classes representing mixtures of soil, healthy plant, and *Cercospora* infested plant in 25% steps were obtained computationally by combining the above-mentioned "pure" reference spectra.

A spectral angle mapper (SAM) algorithm is an algorithm adapted to measure the spectral similarity between two spectra. The spectral similarity can be obtained by considering each spectrum as a vector in q-dimensional space, where q is the number of bands, and comparing the two vectors. The obtained similarity scores (indicating similarity e.g. to the reference spectra for "soil" or "healthy sugar beet plants" etc.) were used as the labels according to one embodiment of the invention, thereby obtaining low-resolution score images, whereby the scores represent pixel-wise assigned labels.

Embodiments of the invention may be of particular use in the context of precision farming, quality control for breeding companies and related technical fields. Almost every plant-related object class (plant of a particular group or species, fields covered with weeds, plants infected by a particular disease, plants with a nutrient deficiency, etc.) is characterized by a particular physiological state or state change that affects the object's reflective properties. Healthy crop and crop that is affected by disease reflect the sun light differently. Using hyperspectral imaging it's possible to detect very small changes in the physiology of the plant and correlate it with spectrum of reflected light for automatically labeling a large number of hyperspectral training images.

In addition, in step 406, one or more first training images 205 are acquired using the first image acquisition technique, e.g. in RGB camera 104. Step 402 and step 406 can be performed concurrently or subsequently. In any case, step 402 and 406 have to be performed such that pairs of first and second training images basically depict the same motive and hence can be spatially aligned with each other. Basically depicting the same motive as used herein means that the relative position (distance and angel) between the camera used for acquiring the images and the motive and preferably also the environmental conditions (light intensity, position of the light source, temperature, spectral composition of the light emitted by the light source) are the same or approximately the same.

Next in step 408, each first training image is spatially aligned with the one of the second training images depicting the same motive.

According to embodiments, the image alignment is performed as follows: An RGB representation of the hyperspectral image used the second training image 106 is calculated by averaging of corresponding spectral bands. A respective green index is calculated from both the "real" RGB image 205 obtained as one of the first training images and from the "computed" RGB image which is a derivative of one of the second training images 106. The green indices are compared with each other for computing and estimating a displacement field. For example, this estimation can be computed using the MATLAB function "imregdemons".

Using a greenness index (or any other motive-derived feature whose difference between the two aligned images is minimized during alignment) has the benefit that also plants or plant parts which are located at slightly different positions in the first and second image can be aligned correctly. For example, factors like wind, a time delay of several hours between acquiring the first and the second image of the same motive, the use of different drones for acquiring the first and second images and/or the use of drones having slightly different trajectories may result in a positional offset of the depicted motive in the first and second images.

According to embodiments, the first image acquisition system used for acquiring the first training images and the second image acquisition system used for acquiring the second training images are mounted on the same carrier system, e.g. a drone. This may ensure that the depicted motives within pairs of first and second training images depicting the same motive have only a small spatial offset of a few pixels.

According to other embodiments, the first training images are obtained by a first sensor mounted on a first carrier system and the second training images are obtained by a second sensor mounted on a second carrier system, the second carrier system being different from the first carrier system or being the first carrier system used multiple times for acquiring the first and second training images subsequently in multiple different flights. For example, the first and second carrier systems can be different drones or can be the same drone used for subsequently obtaining the first and second training images in multiple different flights.

For example, the first training images can be obtained in one or more flights of the first carrier system, and the second training images can be obtained in one or more flights of the second carrier systems. The flights of the first and the second carrier systems are performed at different times, in particular with inter-flight time interval of at least 5 minutes, or even some hours. During this time interval, the position of the plants may have changed slightly, e.g. because of the wind, or because of the movement or re-orientation of the plant or plant parts towards the light.

According to some embodiments, which are particularly useful if the first and second images are acquired in multiple subsequent flights of the same or of different carrier systems, the first and second images are georeferenced images, i.e., images having assigned location information, in particular coordinates of a georeferenced coordinate system. For example, the carrier system used for carrying the first and/or second sensors can comprise a an IMU sensor, in particular a GNSS aided IMU sensor.

An inertial measurement unit (IMU) is a sensor device comprising e.g. motion sensors (accelerometers) and/or rotation sensors (gyroscopes) to continuously calculate the position, the orientation, and the velocity (direction and speed of movement) of a moving object without the need for external references. Often the inertial sensors are supplemented by a barometric altimeter and occasionally by magnetic sensors (magnetometers) and/or speed measuring devices.

In particular, the IMU sensor can be a GNSS aided IMU. The Term "GNSS" (global navigation satellite system) is a navigation system with global coverage that uses satellites to provide autonomous geo-spatial positioning. It allows small electronic receivers to determine their location (longitude, latitude, and altitude/elevation) to high precision (within a few centimeters to metres) using time signals transmitted along a line of sight by radio from satellites. The system can be used for providing position, navigation or for tracking the position of something fitted with a receiver (satellite tracking). As of September 2020, the United States' Global Positioning System (GPS), Russia's Global Navigation Satellite System (GLONASS), China's BeiDou Navigation Satellite System (BDS) and the European Union's Galileo are fully operational GNSSs. Japan's Quasi-Zenith Satellite System (QZSS) is a (US) GPS satellite-based augmentation system to enhance the accuracy of GPS, with satellite navigation independent of GPS scheduled for 2023. The Indian Regional Navigation Satellite System (IRNSS) plans to expand to a global version in the long term. The geoposition of the carrier system at the moment when a first or a second training image is acquired is stored in association with the respective training image for later use during image alignment.

Using a GNSS aided IMU sensor for identifying the position of the carrier system during the acquisition of the first and second training images allows placing the first and second image acquisition sensors on different carrier systems and/or obtaining the first and second training images subsequently.

According to embodiments, the aligning of the first and second image of each pair comprises aligning the first and second images depicting the same motive based on their respective geopositions, thereby providing a roughly aligned image pair, and then refining the alignment as a function of pixel intensity and/or color similarities (e.g. based on a greenness index) for providing the alignment of the first and second image of the pair.

Next in step 410, the labeled second training images (or just their labels) aligned with the RGB image were input to the machine learning program used to train the model. For example, the semantic segmentation deep neural network DeepLabv3+ can be used which already comes with a plurality of feature extraction algorithms. Hence, the aligned first images can be input to the DeepLabv3+ before the first feature extraction process has started. The DeepLabv3+ then performs both the extraction of the first features and the training of the ML-model automatically.

According to another embodiment, the first training images were processed for extracting first image features and the extracted first features and the first training images are provided to the machine learning software.

Irrespective of whether the machine learning program itself or a preprocessing module performs the extraction of the first image features, the spatial alignment of the labels and the first image features may enable a machine learning model, e.g. a semantic segmentation deep neural network, to learn spatial correlations between the labels and the first features during the training.

As a result of the training, a trained ML-model is provided that has learned correlations between first features extracted from the RGB training images and labels spatially aligned to the first training images and its first image features. The trained ML-model is able to predict image labels for any input image having been acquired with the first image acquisition technique and depicting a plant-related motive similar to the motive depicted by the training images.

In step 412, the trained ML-model is provided. For example, the training software 126 or parts thereof can be transferred to another computer via a network connection or via a portable storage medium and used on the other computer for automatically labeling RGB test images. The assigned labels are indicative of the type of object depicted by the test image pixels to which the labels are assigned. The classes are the same classes used in the training phase for labeling the second training images. As was shown in FIG. 3, the trained ML-program accurately produces classification results that visually resemble the ground truth. In other words, the trained ML-program can be used according to embodiments as classifier adapted to accurately predict labels for high-resolution RGB images although during the training labels of hyperspectral images were used. The generation of the training data 110, 205 was performed fully automatically or semi-automatically and did not rely on human annotations.

FIG. 5 a flowchart of a method for using the trained ML-model 132 for automatically labeling images acquired with a first image acquisition technique.

In a first step 502, the trained ML-model 132 is provided. For example, the model and optionally further software modules, for example the feature extraction module 128, are stored on a computer system 120 comprising or configured to receive one or more test images 108.

Next in step 503, one or more test images are acquired using the first image acquisition technique, in particular an RGB image acquisition technique. Each of the test images depicts a plant-related motive such as an agricultural area, a plant, a plant product or a part thereof. The plant-related motive of the test image is similar to the plant-related motives in the first and second training images used for training the ML-model. Step 503 can be performed before step 502.

Next in step 504, the trained ML model is applied on each of the test images. Thereby, first features are extracted from each of the test images. For example, the prediction software 202 can basically be identical to the training software 126 used for training the model and can comprise the feature extraction module 128 comprising a plurality of algorithms for extracting different image features from an RGB image. The image features 204 extracted from the test image are used by the trained ML model for predicting one or more labels and assigning the labels to the test image.

Next in step 506, the predicted labels are output. For example, the predicted labels can be used in a segmentation step for computing a segmented image which is shown to a user via a screen or a print out.

Figure 6:
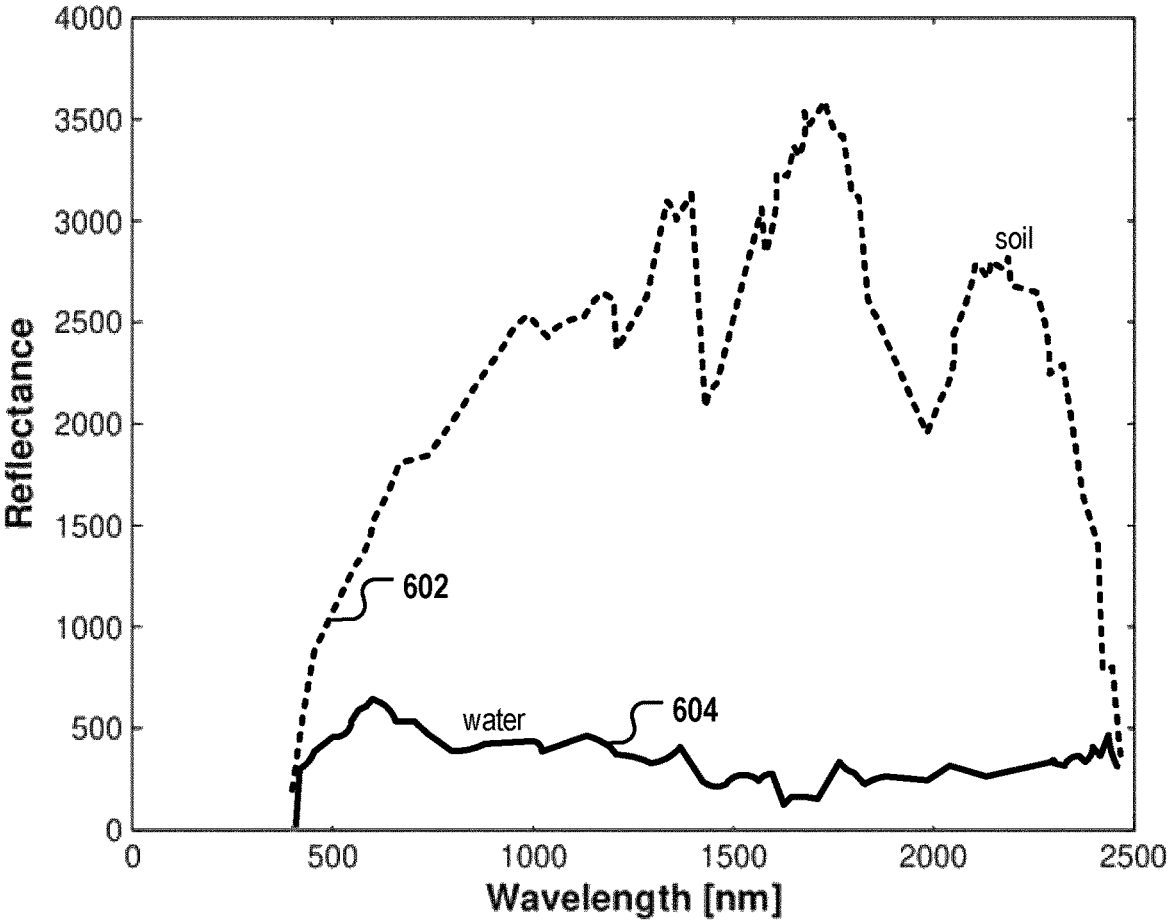
FIG. 6 a plot with two spectral signatures.

FIG. 6 shows a plot comprising a first spectral reference signature 602 being characteristic for soil and comprising a second spectral reference signature 604 being characteristic for water. By comparing the spectral reference signatures 602, 604 with the spectral signatures of each pixel in the second training images, labels being indicative of the type of object depicted in an image or image region or being indicative of the likelihood of depicting an object of this class can be computed.

| List of Reference Numerals | |
|---|---|
| 100 | system |
| 102 | hyperspectral camera |
| 104 | RGB camera |
| 106 | second training image acquired with second image acquisition technique |
| 108 | first training image acquired with first image acquisition technique |
| 110 | labeled second training image |
| 112 | processor(s) |
| 114 | feature extraction module |
| 116 | extracted second features |
| 118 | label prediction modules |
| 120 | computer system |
| 121 | storage medium |
| 122 | alignment module |
| 124 | aligned labels |
| 126 | machine learning training software |
| 128 | feature extraction module |
| 130 | extracted first features |
| 132 | machine learning model |
| 150 | hatching used as label: soil |
| 152 | hatching used as label: healthy plants |
| 154 | hatching used as label: plants infected with Cercospora (CR) |
| 200 | system |
| 202 | prediction software |
| 204 | first features extracted from test image |
| 205 | test image acquired was first image acquisition technique |
| 206 | labeled image generated from test image 205 by prediction software 202 |
| 250 | hatching used as label: soil |
| 252 | hatching used as label: healthy plants |
| 254 | hatching used as label: plants infected with Cercospora |
| 302 | hyperspectral image |
| 304 | labels predicted based on the hyperspectral image |
| 402-412 | steps |
| 502-506 | steps |
| 602 | spectral signature |
| 604 | spectral signature |

The invention claimed is:

1. A computer-implemented method comprising:

acquiring first training images using a first image acquisition technique, each first training image obtained via a first image capture device and depicting a plant-related motive, wherein the plant-related motive comprises one or more of a plant, a plant product, a part of the plant, a part of the plant product, or combinations thereof;

acquiring second training images using a second image acquisition technique, each second training image obtained via a second image capture device and depicting the plant-related motive depicted in a respective one of the first training images, wherein the second image capture device is different from the first image capture device;

calculate a similarity score for each pixel in each of the second training images by utilizing an algorithm configured to:

associate respective spectra in the second training images and one or more reference signatures with vectors corresponding to respective numbers of spectral bands; and compare the vectors;

automatically assigning at least one label to each of the acquired second training images based on the calculated similarity scores;

spatially aligning the first and second training images which are depicting the same one of the motives into an aligned training image pair, the spatially aligning conducted based on one or more of (i) respective Global Navigation Satellite System (GNSS) coordinates associated with the first and second training images, and (ii) one or more respective parameters of the first and second image capture devices;

training a machine-learning model as a function of the aligned training image pairs and the labels, wherein during the training the machine-learning model learns to automatically assign one or more labels to any test image acquired with the first image acquisition technique which depicts a plant-related motive; and providing the trained machine-learning model, wherein the labels are selected from a group of predefined motive classes comprising surface area of a plant or of a product or part of the plant, and wherein the surface area shows a cell structure or organelle in a predefined amount range.

2. The computer-implemented method of claim 1, wherein the plant-related motive is a macroscopic motive of a size of at least 1 mm.

3. The computer-implemented method of claim 1, further comprising:

extracting first features from each of the first training images;

wherein the training is performed such that the machine-learning model learns a spatial correlation of the first features and of the labels based on the spatial correlation of the first features and the labels within each of the aligned first and second training image pairs.

4. The computer-implemented method of claim 1, further comprising:

extracting second features from each of the second training images;

wherein the automatically assigning of the at least one label to each of the acquired second training images comprises analyzing the second features extracted from the second training image for predicting the at least one label of the second training image as a function of the second features extracted from the second training image.

5. The computer-implemented method of claim 1, wherein the first and the second image acquisition techniques are different image acquisition techniques respectively selected from a group comprising:

hyperspectral image acquisition;

RGB image acquisition;

Monochromatic image acquisition;

active image acquisition using an excitation light source;

multi spectral image acquisition; and

IR image acquisition.

6. The computer-implemented method of claim 1, wherein the automatic assigning of the labels to pixels or regions of each of the second training images comprises:

for each of a predefined set of motive classes, acquiring a spectral reference signature from a physical reference motive belonging to this motive class;

comparing the spectral reference signature with the second training images for identifying spectral similarities between pixels or regions of the second training images and the spectral reference signatures; and assigning, to each pixel or region of each of the second training images, a label being indicative of the one of the motive classes being spectrally most similar to this pixel or region.

7. The computer-implemented method of claim 1, wherein the second image acquisition technique covers a larger portion of the whole electromagnetic spectrum than the first image acquisition technique; or wherein the second image acquisition technique covers a different portion of the whole electromagnetic spectrum than the first image acquisition technique.

8. The computer-implemented method of claim 1, wherein the first image acquisition technique has a higher spatial resolution than the second image acquisition technique.

9. The computer-implemented method of claim 1, wherein the spatially aligning of the first and second training images of each of the pairs comprises:

refining the alignment as a function of pixel intensity and/or color similarities such that intensity-differences and/or color-differences between the first and second images are minimized for providing the alignment of the first and second image of the pair.

10. The computer-implemented method of claim 1, wherein the first training images are RGB images and wherein the second training images are hyperspectral images, the spatially aligning of the first and second training images of each of the pairs comprising:

for each pixel of the second training image, computing a red, a green and a blue intensity value by averaging spectral intensity values of respectively the visible red, green and blue spectral band covered by the second training image;

generating an RGB representation of the second training image as a function of the computed red, green and blue intensity values;

computing a first greenness image, each pixel intensity of the first greenness image being a greenness index computed as a function of red, green and blue intensity values of the first training image;

computing a second greenness image, each pixel intensity of the second greenness image being a greenness index computed as a function of red, green and blue intensity values of the RGB representation of the second training image;

automatically performing the aligning of the first and the second training image such that differences of the greenness indices of the first and second images are minimized.

11. The computer-implemented method of claim 1, wherein the trained machine-learning model is configured to:

assigning the one or more labels to the test image such that at least one of the said labels is assigned to each pixel of the test image; and semantically segmenting the test image by grouping pixels of the test image sharing the same label or sharing a sufficiently similar label into the same segment.

12. The computer-implemented method of claim 1, wherein the labels are selected from the group of predefined motive classes further comprising:

area covered with healthy plants;

area covered with plants infected with a particular disease and/or parasite;

area covered with plants of a particular species;

area covered with plants of a particular variety;

area covered with plants treated with a particular substance, in particular a fungicide, pesticide, herbicide and/or fertilizer;

area covered with plants treated according to a particular irrigation schema;

area not covered with any plants;

area covered with a particular type of soil;

area covered with a mixture of predefined fractions of two or more of the aforementioned types of covering.

13. The computer-implemented method of claim 1, wherein the labels are selected from the group of predefined motive classes further comprising:

surface area of a plant or of a product or part of this plant, whereby the surface area is healthy;

surface area of a plant or of a product or part of this plant, whereby the surface area shows symptoms associated with an infection of this area with a particular disease;

surface area of a plant or of a product or part of this plant, whereby the surface area shows an infection of this area with a particular parasite;

surface area of a plant or of a product or part of this plant, whereby the surface area shows a cell structure or organelle in a predefined state;

surface area of a plant or of a product or part of this plant, whereby the surface area shows morphological changes induced by local application of a particular substance;

surface area covered with a mixture of predefined fractions of two or more of the aforementioned types of surface areas.

14. The computer-implemented method according to claim 1, wherein the plant-related motive is an indoor or outdoor agricultural area with multiple plants, a plant, a plant product, a part of the plant, a part of the plant product, whereby none of the plants or plant products has been modified, chemically treated and/or stained for providing labels or for facilitating the labeling.

15. The computer-implemented method according to claim 1, wherein the first training images are obtained by a first sensor mounted on a first carrier system and the second training images are obtained by a second sensor mounted on a second carrier system being identical or different from the first carrier system; and wherein the first training images are obtained in one or more flights of the first carrier system, the second training images are obtained in one or more flights of the second carrier systems, wherein the flights of the first and the second carrier systems are performed at different times, in particular with inter-flight time interval of at least 5 minutes.

16. An image analysis system comprising:

at least one processor;

a storage medium comprising computer-interpretable instructions which, when executed by the at least one processor, cause the processor to perform the computer-implemented method of claim 1.

17. The computer-implemented method of claim 1, wherein the one or more respective parameters of the first and second image capture devices comprise one or more of a first respective position of the first image capture device relative to the plant-related motive, a second respective position of the second image capture device relative to the plant-related motive, the first respective position of the first image capture device relative to the second respective position of the second image capture device, or combinations thereof.

18. The computer-implemented method of claim 1, wherein the algorithm comprises a spectral angle mapper (SAM) algorithm.

19. A computer-implemented method for automatically assigning one or more labels to a test image acquired using a first image acquisition technique, the test image depicting a first plant-related motive, the method comprising:

Providing a trained machine-learning model, the trained machine-learning model being adapted to automatically predict one or more labels to be assigned to any input image acquired with the first image acquisition technique and depicting a plant-related motive comprising one or more of a plant, a plant product, a part of the plant, a part of the plant product, or combinations thereof, the automatic predicting based on a learned alignment between first training images, obtained via a first image capture device, and second training images, obtained via a second image capture device, the alignment based on one or more of (i) respective Global Navigation Satellite System (GNSS) coordinates associated with the first and second training images, (ii) one or more respective parameters of the first and second image capture devices, and (iii) calculating a similarity score for each pixel in each of the second training images by utilizing an algorithm configured to (a) associate respective spectra in the second training images and one or more reference signatures with vectors corresponding to respective numbers of spectral bands, and (b) compare the vectors, wherein the one or more labels are selected from a group of predefined motive classes comprising surface area of a plant or of a product or part of the plant, and wherein the surface area shows a cell structure or organelle in a predefined amount range;

using the trained machine-learning model for predicting the one or more labels of the test image; and outputting the predicted labels of the test image.

20. The computer-implemented method of claim 19, the trained machine-learning model being adapted to automatically predict the one or more labels based on a learned spatial correlation of first features of the first training images acquired with the first image acquisition technique, and labels assigned to the second training images, the second training images showing the same motives as the first training images and being spatially aligned to the first training images.

21. The computer-implemented method of claim 19, further comprising:

generating the trained machine-learning model in accordance with a method comprising: acquiring the first training images using the first image acquisition technique, each first training image depicting a second plant-related motive, wherein the second plant-related motive is selected from a group comprising: an indoor or outdoor agricultural area, a plant, a plant product, a part of the plant, a part of the plant product;

acquiring the second training images using a second image acquisition technique, each second training image depicting the second plant-related motive depicted in a respective one of the first training images;

automatically assigning at least one label to each of the acquired second training images;

spatially aligning the first and second training images which are depicting the same one of the second plant-related motives into an aligned training image pair; and training a machine-learning model as a function of the
aligned training image pairs and the labels, wherein
during the training the machine-learning model learns
to automatically assign one or more labels to any test
image acquired with the first image acquisition tech-
nique which depicts a plant-related motive.

\* \* \* \* \*